United States Patent
Conant

(10) Patent No.: US 7,553,996 B2
(45) Date of Patent: Jun. 30, 2009

(54) GAS CLATHRATE HYDRATE COMPOSITIONS, SYNTHESIS AND USE

(76) Inventor: Lawrence D. Conant, 290 Berlin St., Apt. 89, Clinton, MA (US) 01510

( * ) Notice: Subject to any disclaimer, the term of this patent is extended or adjusted under 35 U.S.C. 154(b) by 322 days.

(21) Appl. No.: 11/682,739

(22) Filed: Mar. 6, 2007

(65) Prior Publication Data

US 2008/0221373 A1 Sep. 11, 2008

(51) Int. Cl.
*F17C 11/00* (2006.01)
(52) U.S. Cl. .......................................... 585/15; 62/45.1
(58) Field of Classification Search .................... 585/15
See application file for complete search history.

(56) References Cited

U.S. PATENT DOCUMENTS

| | | | |
|---|---|---|---|
| 5,589,311 A | 12/1996 | Russell | |
| 6,350,298 B1 | 2/2002 | Su et al. | |
| 6,735,960 B2 | 5/2004 | Mao et al. | |
| 6,929,679 B2 | 8/2005 | Muller et al. | |
| 7,059,143 B1 | 6/2006 | Zugibe et al. | |
| 2004/0198611 A1 | 10/2004 | Atkinson | |
| 2004/0230084 A1* | 11/2004 | Yagi ............................ | 585/15 |

OTHER PUBLICATIONS

Blackwell, V.R. (1998). Formation Processes of Clathrate Hydrates of Carbon Dioxide and Methane, PhD dissertation, California Institute of Technology.*
Majeed, A.I. (1983). Prediction of Inhibition of Hydrate Formation Using the PFGC Equation of State, PhD dissertation, Oklahoma State University.*
Smentkowski, "Hydrogen Characterization at General Electric—Global Research—Niskayuna," General Electric Company, Sep. 2003.
Avlonitis, "An Investigation of Gas Hydrates Formation Energetics," AIChE Journal, vol. 51, No. 4 (Apr. 2005).
Donohoue et al., "Effects of Hydrate Formation on Gas Composition: A physical chemistry and environmental science question," Augustana College, Aug. 2000, p. 1, 4, Table 2.
Benziher, Raman Spectroscopic Investigation of CO2 Clathrate Formation, a Thesis, Ohio State University (2004).
Feil et al., "The Polyhedral Clathrate Hydrates, Part 2, Structure of the Hydrate Tetra Iso-amyl Ammonium Fluoride," Journal of Chemical Physics, vol. 35, No. 5 (Nov. 1961).
Florusse et al., "Stable Low-Pressure Hydrogen Clusters Stored in a Binary Clathrate Hydrate," Science, vol. 306, pp. 469-471 (2004).
Mao et al., "Hydrogen Clusters in Clathrate Hydrates", Science, vol. 297, pp. 2247-2249 (2002).
Rovetto et al., Colorado School of Mines, Center for Hydrate Research, May 16-19th, 2006 Program Review.

(Continued)

*Primary Examiner*—Glenn A Caldarola
*Assistant Examiner*—Brian McCaig
(74) *Attorney, Agent, or Firm*—Fish & Richardson P.C.

(57) ABSTRACT

A solid clathrate hydrate comprising lactate anion and a calcium cation. The clathrate hydrate serves as a sponge that can be used to store a gas such as hydrogen, methane, oxygen, or carbon dioxide. The presence of carboxylate anion (lactate) stabilizes the clathrate so that it is solid and stable at relatively mild temperatures and pressures.

18 Claims, 7 Drawing Sheets

OTHER PUBLICATIONS

Smith et al., "Assessing the Thermodynamic Feasibility of the Conversion of Methane Hydrate into Carbon Dioxide Hydrate in Porous Media," First National Conference on Carbon Sequestration, p. 47 (May 14-17, 2001).

Struzhkin et al., "Inorganic Clathrates for Hydrogen Storage", Hydrogen Program Annual Review, (DOE 2005), Carnegie Institute Washington.

The Challenge of Hydrogen Storage, Los Alamos Energy Security, vol. 1, No. 2, p. 4 (Fall 2005).

Uchida et al., "In Situ Observations of Methane Hydrate Formation Mechanisms in Raman Spectroscopy", Annals New York Academy of Sciences, pp. 593-601 (2004).

* cited by examiner

GAS CLATHRATE HYDRATE COMPOSITIONS, SYNTHESIS AND USE

TECHNICAL FIELD

The general field of this invention is the storage of gases in clathrate structures.

BACKGROUND

Clathrates are solid cage-like structures in which hydrogen bonding between molecules forms a lattice of host molecules that trap and contain other molecules termed guest molecules. For example, a gas clathrate hydrate is composed primarily of water molecules that form a lattice enclosing and trapping a gas.

Clathrates typically form at low temperature and high pressure.[1] Guest molecules (in addition to a gas) can stabilize the clathrate to higher temperatures and pressures.[2]

[1] Raman Spectroscopic Investigation of $CO_2$ Clathrate Formation, a Thesis, Patric Benziher, Ohio State University 2004.
[2] "Hydrogen Clusters in Clathrate Hydrates", Mao, W. L. et al, Science, Vol. 297, pages 2247-2249 (2002).

Different structural arrangements of clathrates are distinguished by their unit cells—i.e., repeating structures of their respective lattice networks.

One clathrate structure, termed "sII", is well studied. See, for example, "Inorganic Clathrates for Hydrogen Storage", Struzhkin et al, Hydrogen Program Annual Review, DOE 2005 Carnegie Institute Washington. The sII unit cell is made up of 16 pentagonal dodecahedrons and 8 pentakaidecahedrons, respectively designated the small cage and large cage. Typically, large guest molecules occupy the large cage, leaving the small cage for gas storage. Struzhkin et al. cited above. The large proportion of $5^{12}$ cavities in sII clathrates is thought responsible for the similarities in the Raman spectra to gas saturated water: the sII clathrate has a peak in Raman analysis at the 3100 cm$^{-1}$ region. See, Mao et al., cited above.

U.S. Pat. No. 6,735,960 (hereby incorporated by reference in total) includes figures (FIGS. 5A, 5B, and 5C) depicting an sII crystal clathrate structure. The structure is characterized by cubic crystals containing sixteen $5^{12}$ cavities, eight larger $5^{12}6^4$ cavities. The tetrahedral $5^{12}6^4$ cavities form an open tetrahedral network, with their centers arranged in a structure analogous to that of cubic ice, separated by groups of three $5^{12}$ cavities. FIG. 5B of '960 shows four hydrogen molecules in one of the larger $5^{12}6^4$ cavities and FIG. 5C of '960 shows two hydrogen molecules in one of the smaller $5^{12}$ cavities. The unit cell contains 136 $H_2O$ molecules and 64 $H_2$ molecules for a ratio of hydrogen/water=0.47. The '960 patent reports that the sII clathrate structure vanished above 115° K (at 10 kPa), but, at higher pressure (200 Mpa), the structure is stable to 280° K.

A second clathrate structure, termed "sI", exhibits a long broad peak above 3000 cm$^{-1}$ in Raman spectrometry for the O—H stretching mode.[3] In the sI structure, linear tetrakaidecahedral ($5^{12}6^2$) cavities form three orthogonal axes holding a dodecahedral cavity wherever they cross (ratio 6:2 respectively per unit cell); each dodecahedral cavity sitting (in a body-centered cubic arrangement) within a cube formed by six tetrakaidecahedral ($5^{12}6^2$) cavities. These ($5^{12}6^2$) cavities join at their hexagonal faces to form columns.

[3] "In Situ Observations of Methane Hydrate Formation Mechanisms in Raman Spectroscopy", Uchida et al, Annals New York Academy of Sciences, p 593-601 (DATE?).

A third clathrate structure is termed "sH".

The following tables present some clathrate properties.[4]

[4] http://www.lsbu.ac.uk/water/clathrat2.html.

| Characteristic properties of the clathrates | | | | |
|---|---|---|---|---|
| Type | Lattice | Space group | Unit cell | Unit cell formula[5] |
| Clathrate I | Cubic | Pm3n | a = 1.20 nm | $(S)_2 \cdot (L)_6 \cdot 46H_2O$ |
| Clathrate II | Face-centered cubic | Fd3m | a = 1.73 nm | $(S)_{16}(L+)_8 \cdot 136H_2O$ |
| Clathrate H | Hexagonal | P6/mmm | a = 1.23 nm c = 1.02 nm | $(S)_5(L++) \cdot 34H_2O$ |

[5] Not all cavities would normally be filled; S = small guest; L = large guest; L+ = larger guest; L++ = largest guest

| Clathrate Unit Cells | | | | | |
|---|---|---|---|---|---|
| Cavity | $5^{12}$ | $5^{12}6^2$ | $5^{12}6^4$ | $5^{12}6^8$ | $4^35^66^3$ |
| $H_2O$ | 20 | 24 | 28 | 36 | 20 |
| Mean cavity radius, Å | 3.95 | 4.33 | 4.73 | 5.71 | 4.06 |
| free volume, Å$^3$ | 51 | 77 | 120 | 213 | 44 |
| Clathrate I,/unit cell | 2 | 6 | — | — | — |
| Clathrate II,/unit cell | 16 | — | 8 | — | — |
| Clathrate H,/unit cell | 3 | — | — | 1 | 2 |
| Guest molecules, e.g. approximate radius, Å | Ar, $O_2$, $N_2$, $CH_4$ 1.8-2.2 | $CO_2$, $C_2H_6$ 1.8-2.7 | $C_3H_8$, $(CH_3)_3CH$ 2.8-3.1 | $(CH_3)_3CC_2H_5$ 3.5-4.3 | $CH_4$ 1.8 |

Feil et al, *The Polyhedral Clathrate Hydrates. Part 2. Structure of the Hydrate Tetra Iso-amyl Ammonium Fluoride*, Journal of Chemical Physics, Vol 35 No 5 November 1961 review various gas/clathrate structures including a hydrate of tetra iso-amyl ammonium fluoride. The authors postulate that anions and cations substitute for the oxygen in the clathrate structure.

In addition to the '960 patent discussed above concerning storage of $H_2$ in an sII clathrate, there are other reports of clathrate gas storage. Storage of $H_2$ in an SII clathrate is disclosed in "Inorganic Clathrates for Hydrogen Storage", Struzhkin et al, *Hydrogen Program Annual Review*, DOE 2005 Carnegie Institute Washington. Florusse et al. Science Vol. 306, pp. 469-471 (2004) discloses hydrogen storage in a binary SII clathrate hydrate with tetrahydrofuran (THF).

Uchida et al, report[6] that methane forms an sI clathrate, although methane hydrates are generally thought to decompose at standard conditions making recovery difficult. The authors conclude,

[6] "In Situ Observations of Methane Hydrate Formation Mechanisms in Raman Spectroscopy", Uchida et al. *Annals New York Academy of Sciences*, p 593-601 (2004)

Methane hydrate ($CH_4 \cdot nH_2O$) is a crystalline molecular complex that includes a large quantity of methane molecules and is stable at high pressure and low temperatures. Its unit cell consists of 46 water molecules that construct two small cages (pentagonal dodecahedron, $5^{12}$) and six large cages (tetrakaidecahedron, $5^{12}6^2$) [Citing Sloan, Ed., Jr., 1998. *Clathrate Hydrate of Natural Gases*, 2nd edit. Marcel Dekker Inc., New York]. Since at most one $CH_4$ molecule can occupy each cage, eight or fewer $CH_4$ molecules are expected per unit cell.

If the hydrate is fully occupied by $CH_4$ molecules, the number of moles of water reacted with one mole of $CH_4$, n, is 5.75.

They observed Raman spectra due to hydrate formation at 264.2° K (−8.95° C.) and 6.3 MPa. (62.18 standard atmospheres)

In a May 16-19 2006 Program Review, Rovetto et al. of the Colorado School of Mines Center for Hydrate Research report storage of $H_2$ in sII clathrates stabilized by tetrahydrofuran, cyclohexanone, tetra-n-butylammonium bromide. They also reference a methane p-toluene sulfonic acid structure

SUMMARY

One aspect of the invention generally features a solid clathrate hydrate comprising lactate anion and a calcium cation. In this aspect of the invention, the clathrate hydrate is, in effect, a sponge that can be used to store a gas. The presence of the carboxylate (lactate) anion stabilizes the clathrate so that it is solid and stable at relatively mild temperatures and pressures, e.g. at 10° C. and 165 psi (11.2 standard atmospheres); in fact, the clathrate is stabilized even at much lower pressures, such as 1 atmosphere (14.7 psi). Preferably the clathrate exhibits a long broad peak above 3000 cm-1 in Raman spectrometry for the O—H stretching mode. That and other factors are consistent with an sI clathrate structure and not with other known structures.

The carboxylate clathrates efficiently store gases whose molecular diameter is 5 Å or less. Hydrogen, methane and oxygen are particularly good candidates for storage by this method. The efficiency of gas storage is very good and can be 3% by weight or even higher, for example 5% or even 8% or higher.

An additional cation such has sodium, potassium or magnesium can be included to a limited extent. Acetate can also be included, along with lactate.

Another aspect of the invention generally features a solid sI clathrate hydrate comprising a carboxylate anion; a cation; and a gas having a molecular diameter of 5 Å or less. The gas comprises at least 5% by weight of the clathrate hydrate, and the clathrate is solid and stable at 10° C. and 165 psi.

Also preferably, the clathrate hydrate is a man-made structure, for example it is substantially free of components of sea water that may be found with naturally occurring clathrates such as high levels of chlorine or iodine.

The clathrates described above can be used in methods of gas storage, by providing the solid clathrate and adding the gas to the solid clathrate. The gas storage can be a renewable process, in which, after adding the gas to the solid clathrate, at least some of the gas is released (e.g., to fuel apparatus for converting the gas to mechanical or electrical energy, such as a fuel cell or an internal combustion engine). Thereafter gas is added to recharge the gas-depleted clathrate. The end user may simply exchange a container of gas depleted clathrate for a container of clathrate charged with gas.

The invention provides a relatively light structure with larger guest molecules occupying a relatively low percentage of cages so as to enhance the volume available for gas storage and the overall percentage of gas stored by weight and gas density. While not wanting to limit this invention to the following theory, we present the following as one way to visualize the gas clathrates that are stabilized with a carboxylate, particularly lactate.

When calcium and lactate molecules are included with the clathrate, they occupy oxygen positions in a hexagonal face of the tetrakaidecahedron structure. Further, one lactate molecule extends into one large cage of an sI unit structure and the other lactate molecule extends into an adjacent sI clathrate unit structure. This occupancy leaves five large cages and two small cages in each clathrate unit structure available for other guest gases.

The lactate molecule extending into the cage structure stabilizes the structure so that it is stable at higher temperatures and lower pressures, perhaps because these carboxylates offer a methyl group at the end of the molecule, which stabilizes the structure in a similar manner to methane in the formation of an sI clathrate, yet at surprisingly high temperatures and low pressures. For example, the lactate-containing clathrate remains stable under conditions that are relatively mild (e.g., below 165 psi at room temperature, e.g., 293-298° K).

Assuming the anion and cation occupy the traditional oxygen sites, an excess of hydrogen atoms is required to represent the remainder of the water molecules associated with the displaced oxygen atoms in the clathrate structure. Thus the pH of the clathrate solution would be slightly below neutral to supply these extra hydrogen atoms.

The invention thus stores significant amounts of the gas in a relatively dense structure. The five large cages have a mean radius of 4.33 Å, (a diameter of 8.66 Å).[7] A cluster of six hydrogen molecules have a diameter of 6.57 Å. Therefore, the large cage can theoretically hold up to six molecules of $H_2$ each. The two small cages can hold two molecules each. This gives a total potential of 32 moles of $H_2$ per unit. The formula weight of a unit according to the invention is about 391 grams depending on the final components, providing a theoretical hydrogen storage potential of:

$$32(2)/(32*2+391)*100\%=14.1\%$$

[7] http://www.lsbu.ac.uk/water/clathrat2.html.

Other gases of appropriate molecular diameter (6 Å or less; preferably 5.5 Å or less; most preferably 5 Å or less) can also be stored. Among the gases with a diameter of 6 Å or less are helium, neon, argon, krypton, nitrogen, oxygen, methane, xenon, ethane, carbon dioxide and carbon tetrafluoride.

Such clathrates can safely store hydrogen to power a vehicle using, for example, a fuel cell. Methane or other gas may be stored as fuel for an internal combustion engine. The reversibility of gas storage enables a method of providing the gas clathrate described above (i.e., charged with gas), subjecting the charged gas clathrate to discharging conditions, freeing the gas, and then adding gas to recharge the gas clathrate. This system could be used, for example, to fuel vehicles which would react the gas as it is released and then re-fuel at a supply station by exchanging spent clathrate for clathrate charged with gas, or by adding the gas.

The system could be used to store $O_2$ at higher density than traditional gas storage methods (i.e., methods that simply pressurize $O_2$ vapor), thus enabling smaller storage containers for medical oxygen or other applications that do not involve liquification.

Carbon dioxide storage could be used to reduce release of the gas into the atmosphere. Substitution of some sodium cation is desirable when storing carbon dioxide.

In general, lactate clathrates provide a dense storage medium for appropriately sized gases, because they are in solid form at relatively low pressures and relatively high temperatures. The clathrate can store amounts of the gas ranging from relatively low densities to very significant densities (3, 4, 5, 6, 8 g/l or more).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
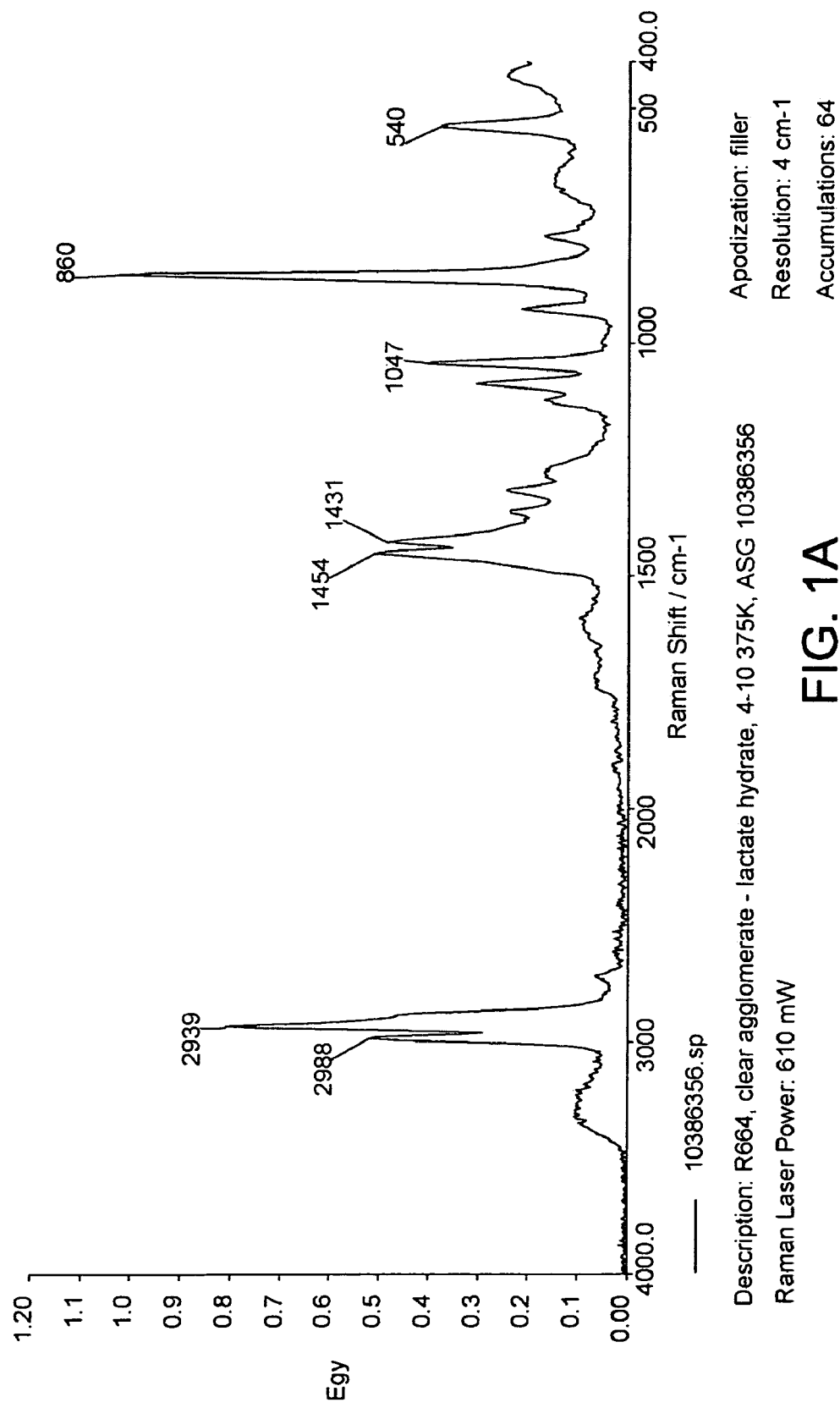
FIGS. 1A-1C are Raman Spectra and FIG. 1D is an infrared spectra of a lactate clathrate.

The following specific examples illustrate the invention.

Testing has shown that neutralized lactic acid with calcium hydroxide forms a clathrate structure. The molecular weight can be adjusted by substituting sodium for some of the calcium. Additionally, the molecular weight can be reduced by substituting acetic acid for some of the lactic acid. This disclosure describes the method used to produce these clathrates and chemical identification of the clathrates.

EXAMPLE 1

TABLE 1

Chemical Composition for Example 1

| Chemical | Grams | Moles |
|---|---|---|
| Distilled water | 65.1 | 3.6 |
| 85% Lactic Acid | 40.8 | 0.39 |
| Sodium Hydroxide | 8.2 | 0.20 |
| Calcium Hydroxide | 5.2 | 0.07 |
| Total | 119.3 | 4.26 |

Table 1 shows the chemicals used in the first example. The lactic acid is added to half of the distilled water. The hydroxides are then added to the remaining distilled water The two mixtures are then combined. After approximately 80 minutes a fluffy white solid has formed.

Note that from an acid neutralization standpoint, there are two hydroxyl groups contributed by the calcium hydroxide. The total of the hydroxides is then $$2*0.07+0.20=0.34 \quad [1]$$

This is slightly less than the number of moles of lactic acid and so the pH is about 6. This incomplete neutralization of the acid supplies the extra hydrogen needed by the ionic clathrate structure.

There are four sources of water; the initial distilled water, the water that makes up 15% of the Lactic Acid, and the water formed by the neutralization of each of the hydroxides. This is shown in Table 2.

TABLE 2

Water Sources in Example 1

| Chemical | Moles Water Formed |
|---|---|
| Distilled water | 3.6 |
| 85% Lactic Acid | 0.39 |
| Sodium Hydroxide | 0.20 |
| Calcium Hydroxide | 0.14 |
| Total | 4.33 |

The hydration can be calculated by dividing the moles of water by the moles of lactic acid $$4.33/0.39=11.1 \quad [2]$$

Clathrates do not have a specific chemical formula. The final formula is dependent on what is trapped in the cage as a guest molecule. The final product for Example 1 has the formula:

$$0.20Na0.07Ca0.39La4.33H_2O \quad [3]$$

Where "La" represents the lactate ion.

This formula [3] can be multiplied by 1/0.39 to give a formula based on one mole of lactic acid.

$$0.51Na0.18CaLa11.1H_2O \quad [4]$$

The formula weight of formula [4] is 308.92.

The specific gravity (SG) of this material was found by displacement to be 1.284.

The unit cell volume based on one molecule of lactate is:

$$\text{Formula Wt}*(10^{24} cc/Å^3)/(6.023*10^{23}*SG)=308.92 \text{ grams/mole}*(10^{24} cc/Å^3)/(6.023*10^{23} \text{ molecules/mole}*1.284)=399.4 Å^3 \quad [5]$$

EXAMPLE 2

A portion of the solids generated in Example 1 were dried as described in Table 3.

TABLE 3

Drying Test

| Initial Weight | Final Weight | Avg. Temperature | Time, Min. |
|---|---|---|---|
| 9.22 | 9.22 | 295° K | N/A |
| 10.54 | 6.65 | 342° K | 227 |
| 27.86 | 13.18 | 375° K | 394 |

In each case the solids achieved a constant weight at their respective temperatures. The samples were then submitted for Raman Spectroscopic analysis on a Perkin Elmer FTIR series with NIR FT Raman Accessory, LIMS 0627, SOP 008.07.

Figure 1B:
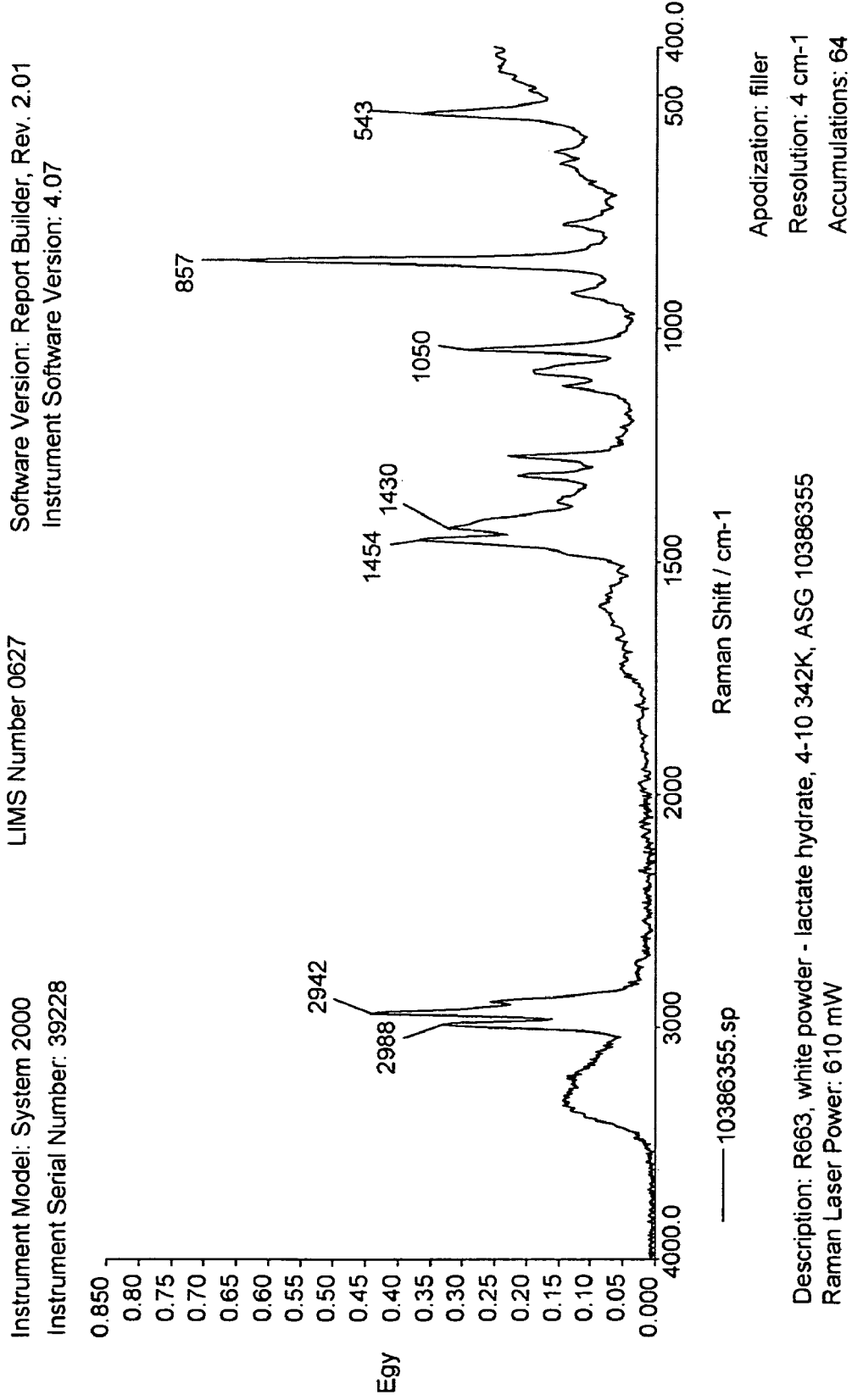
Figure 1C:
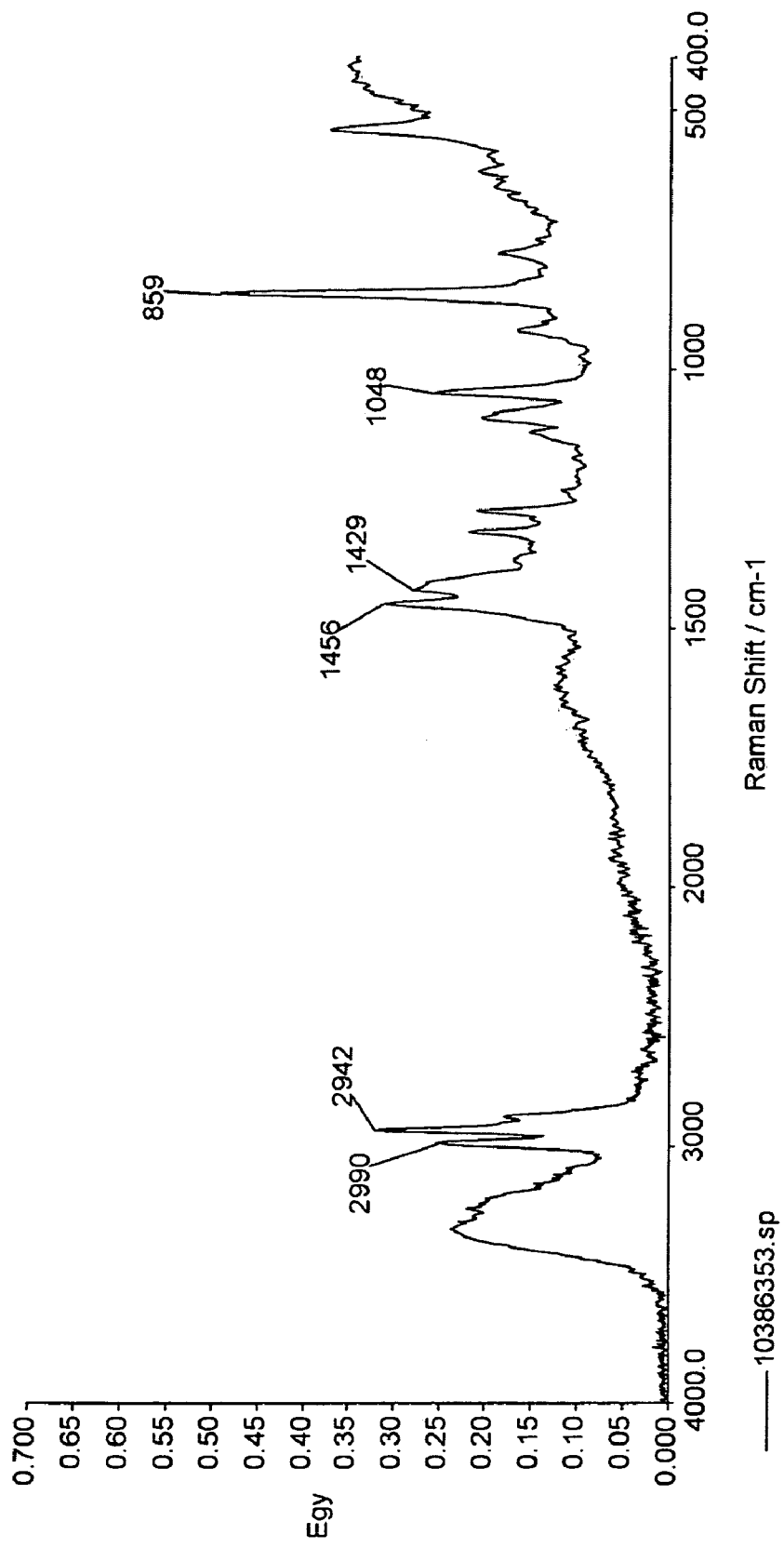

FIGS. 1A-1C are spectrum generated by Raman Spectrometry of FTIR of three samples generally prepared as above (samples 295, 342 and 375, respectively). Note that as the temperature is increased, the O—H vibron from 3100 cm$^{-1}$ to 3600 cm$^{-1}$ decreases. Simultaneously, the twin peaks in the neighborhood of 2942 cm$^{-1}$ and 2990 cm$^{-1}$ increase. Also the twin peaks in the neighborhood of 1429 cm$^{-1}$ and 1456 cm$^{-1}$ increase. The region of 2965 cm$^{-1}$ to 2969 cm$^{-1}$ is known to represent anti-symmetric stretching of the $CH_3$ portion of a molecule. The 1465 cm$^{-1}$ to 1466 cm$^{-1}$ region is known to represent $CH_3$ deformation. Therefore, as the water molecules are removed by drying, the $CH_3$ portion of the molecule undergoes less inhibited structural changes. This is consistent with the methane clathrate sI structure. Also note that an sII clathrate would show a peak in the 3600 cm$^{-1}$ to 3100 cm$^{-1}$ region, which is not found.

Figure 1D:
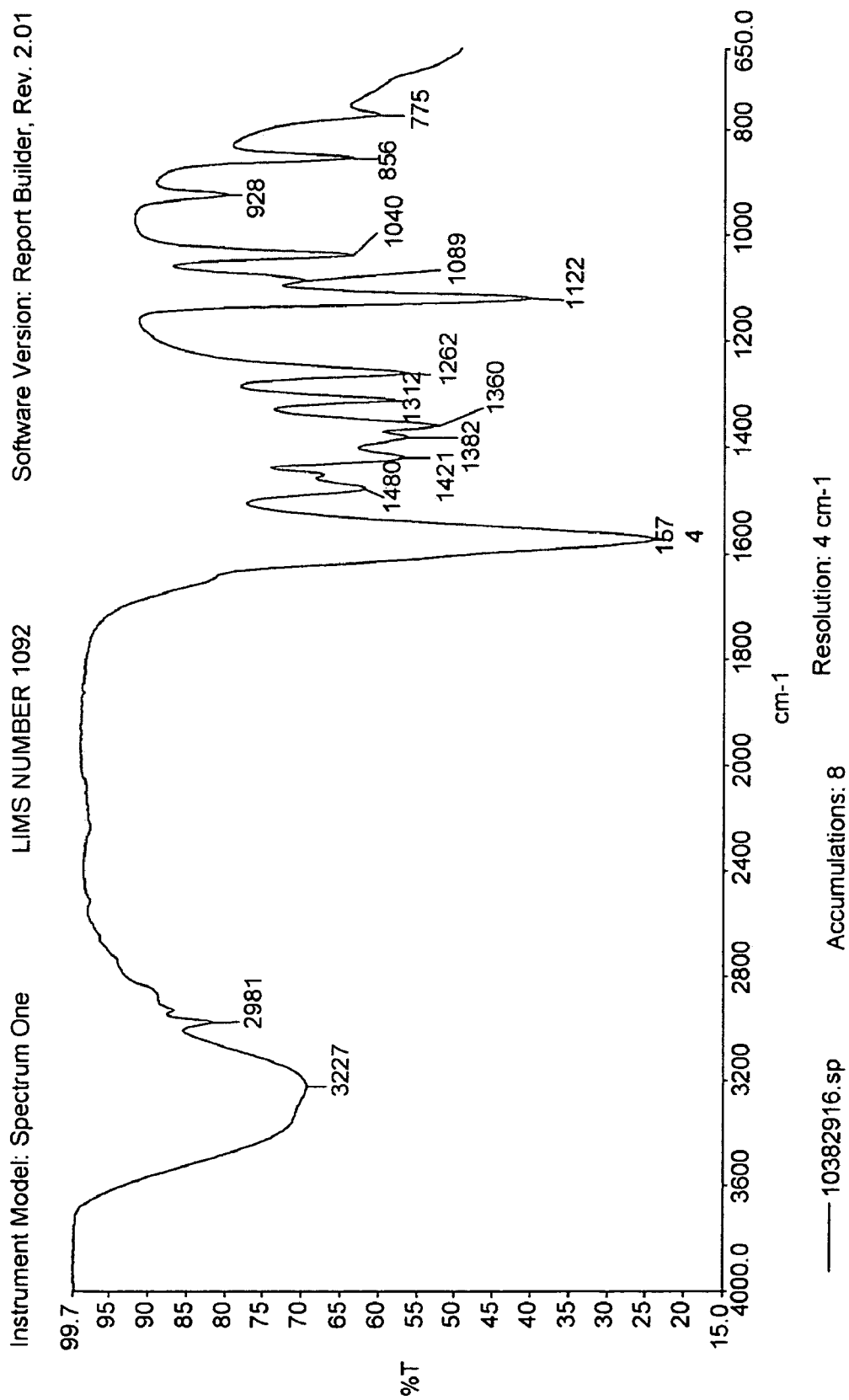

FIG. 1D is an IR absorption spectrum generated on a different sample.

EXAMPLE 3

It is possible to substitute acetic acid for some of the lactic acid as shown in the following example.

TABLE 4

Composition Example 3

| Chemical | Grams | Moles |
|---|---|---|
| Distilled water | 104.3 | 5.76 |
| 85% Lactic Acid | 20.2 | 0.19 |
| Glacial Acetic Acid | 21.6 | 0.36 |
| Sodium Hydroxide | 15.0 | 0.37 |
| Calcium Hydroxide | 10.2 | 0.14 |
| Total | 171.3 | 6.82 |

TABLE 5

Water Present in Composition of Example 3

| Chemical | Moles Water Formed |
|---|---|
| Distilled water | 5.76 |
| 85% Lactic Acid | 0.17 |
| Glacial Acetic Acid | 0.00 |
| Sodium Hydroxide | 0.37 |
| Calcium Hydroxide | 0.28 |
| Total | 6.58 |

The hydration can be calculated by dividing the water present by the total moles of carboxylate.

$$6.58/(0.19+0.36)=12.0 \quad [6]$$

The final product has the formula:

$$0.37Na0.14Ca0.19La0.36Ac6.58H_2O \quad [7]$$

Where La represents the lactate ion and Ac the acetate ion.

This formula [7] can be multiplied by 1/(0.19+0.36) to give a formula based on one mole of carboxylate.

$$0.67Na0.255Ca0.35La0.65Ac12.0H_2O \quad [8]$$

The formula weight of formula [12] is 331.90.

The specific gravity of this material was found by displacement to be 1.210.

The unit cell volume based on one molecule of carboxylate is:

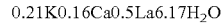
$$331.90*(10^{24}cc/Å^3)/(6.023*10^{23}*1.210)=455.4 Å^3 \quad [9]$$

EXAMPLE 4

In this example potassium has been substituted for sodium.

TABLE 6

Table 6: Chemical Composition Example 4

| Chemical | Grams | Moles |
|---|---|---|
| Distilled water | 94.4 | 5.2 |
| 85% Lactic Acid | 52.7 | 0.50 |
| Potassium Hydroxide | 7.7 | 0.14 |
| Calcium Hydroxide | 12.1 | 0.16 |
| Total | 168.7 | 6.0 |

TABLE 7

Water Present in Example 4 Composition

| Chemical | Moles Water Formed |
|---|---|
| Distilled water | 5.2 |
| 85% Lactic Acid | 0.44 |
| Potassium Hydroxide | 0.21 |
| Calcium Hydroxide | 0.32 |
| Total | 6.17 |

The hydration can be calculated by dividing the moles of water by the moles of lactic acid $$6.17/0.5=12.3 \quad [10]$$

The final product has the formula:

$$0.21K0.16Ca0.5La6.17H_2O \quad [11]$$

Where La represents the lactate ion.

This formula [11] can be multiplied by 1/0.5 to give a formula based on one mole of lactic acid.

$$0.42K0.32CaLa12.3H_2O \quad [12]$$

The formula weight of formula [12] is 341.0.

The specific gravity of this material was found by displacement to be 1.248.

The unit cell volume based on one molecule of lactate is:

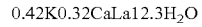
$$341.0*(10^{24}cc/Å^3)/(6.023*10^{23}*1.248)=453.7 Å^3 \quad [13]$$

Examples 5-9 demonstrate gas storage using the lactate clathrate.

EXAMPLE 5

Forming Carboxylate Hydrate with Lactic Acid

TABLE 8

Equipment

| Equipment | Description |
|---|---|
| Cornelius Keg | 19 L Stainless Steel, Pressure Rating 135 psig |
| Digital Pressure Switch | SMC ISE4B-T1-65 |
| Hydrogen Regulator | Smith H1732 |
| Petri Dish | Pyrex 100 mm diameter |

TABLE 9

Ingredients for carboxylate hydrate.

| Substance | Grams | Moles | Moles water | Moles Lactate | Moles Calcium |
|---|---|---|---|---|---|
| Distilled Water | 70.76 | 3.9 | 3.9 | | |
| 85% Lactic Acid | 30.07 | 0.28 | 0.25 | 0.28 | |

TABLE 9-continued

Ingredients for carboxylate hydrate.

| Substance | Grams | Moles | Moles water | Moles Lactate | Moles Calcium |
|---|---|---|---|---|---|
| Ca(OH)$_2$ | 10.4 | 0.14 | 0.281 | | 0.14 |
| Total | 111.23 | 4.3 | 4.439 | 0.284 | 0.14 |

The carboxylic hydrate was made by combining 29.1 grams of distilled water with the lactic acid in one container. The remaining distilled water was combined with the calcium hydroxide in a second container. The two containers were then mixed and the formation reaction allowed to proceed for 130 minutes. This produced a solid hydrate with 15.6 moles of water for each mole of lactic acid and 0.49 moles of calcium per mole of lactic acid. The final specific gravity of the solid was 1.175.

The resulting formula is 0.488CaLa 15.6H$_2$O with a formula weight of 391.0.

EXAMPLE 6

Hydrogen Storage, Phase 1

57.14 grams of the carboxylic hydrate was spread over the 100 mm Petri dish and placed in the bottom of the Cornelius Keg. The keg was pressurized to the initial pressure shown in Table 10. The absorption was allowed to proceed with pressure readings. When the pressure reached 90 to 91 psig, the Cornelius Keg was again pressurized to the original level. This recharging was repeated until the keg maintained a near steady pressure.

TABLE 10

Hydrogen Storage, Phase 1

| Time, hours | Pressure, psig |
|---|---|
| Charge 1 | |
| .283 | 95 |
| 1.33 | 94 |
| 23.5 | 93 |
| 34.5 | 92 |
| 39.5 | 92 |
| 43.75 | 91 |
| 58.5 | 91 |
| 59.5 | 90 |
| 71.42 | 89 |
| Charge 2 | |
| 71.5 | 96 |
| 82.5 | 95 |
| 85 | 94 |
| 94 | 93 |
| 106.5 | 92 |
| 115.5 | 91 |
| 127.5 | 90 |
| Charge 3A | |
| 128.0 | 95 |
| 130.6 | 94 |
| 137.4 | 93 |
| 143.9 | 92 |
| 152.2 | 92 |
| Charge 3B | |
| 153.1 | 91 |
| 159.4 | 91 |
| 163.5 | 91 |
| 165.1 | 90 |

Figure 3:
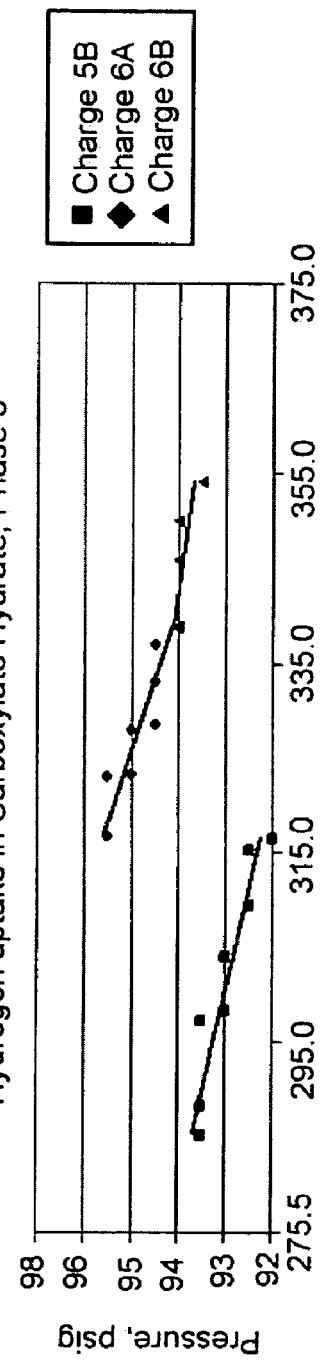

FIG. 3 is a graph of hydrogen uptake over time from this recharging experiment for three charges designated Charge 1, Charge 2 and Charge 3A. Each charge was fitted to a least squares fit, For Charge 1: Psig=94.625−0.0741 (Time)
For Charge 2: Psig=103.49−0.1076 (Time)
For Charge 3A: Psig=117.48−0.1776 (Time)

These three equations were then used to calculate the initial and final pressures for each Charge based on start and end times. These pressures were then used to calculate the number of moles of free hydrogen gas in the Cornelius Keg at each condition.

Hydrogen is almost an ideal gas. For these molar calculations, the moles of hydrogen were calculated using the Van der Waals equation $$p = nRT/(V-nb) - a*(n/V)^2$$

Where:
p=pressure Atmospheres
n=Number of moles
R=Universal Gas Constant 0.0820575 Atm L/(mole-K)
T=Temperature ° K=295
V=Volume=19 liters
a,b=Van der Waals constants For hydrogen the Van der Waals constants are a=0.245 ATM-L$^2$/Mol$^2$ and b=0.0265 L/mol. Pressures were converted to psig by multiplying the pressure in atmospheres by 14.7 to get psig.

Table 11 lists the initial and final pressures and the calculated moles of hydrogen for each charge. The hydrogen uptake is the difference between the initial and final readings. The total for all three charges is also shown. This total is divided by the number of moles of carboxylate (lactate) used in the test. This is (57.14/111.23)*0.284=0.146

TABLE 11

| | Psig | Moles H$_2$ |
|---|---|---|
| Charge 1 | | |
| Initial | 94.6 | 5.811 |
| Final | 89.3 | 5.53 |
| Change | | 0.281 |
| Charge 2 | | |
| Initial | 95.8 | 5.874 |
| Final | 89.8 | 5.554 |
| Change | | 0.320 |
| Charge 3A | | |
| Initial | 94.8 | 5.823 |
| Final | 91.9 | 5.524 |
| Change | | 0.156 |
| Total Change | | 0.757 |
| Moles H2/Mole La | | 5.2 |

The last entry in Table 11 shows that there were approximately 5 moles of hydrogen stored for each mole of lactate used in the test. This is consistent with the sI clathrate model and each molecule of carboxylate occupying one of the six large cells and one molecule of hydrogen occupying each of the other five large cages.

Storing 5 moles of hydrogen for one mole of lactate gives 5 moles of hydrogen to a formula weight of 391. This is 2.49% by weight=(10/(391+10)*100%.

FIG. 3 is a plot of the data from Table 11. The data for Charge 3B shown in FIG. 3, represents the continuation of the test. The dramatic change in uptake rate in Charge 3 is indicative of the second molecule moving into each cage. Continued testing is reported in phase 2 below. There is good agreement between the slope of the Charge 3B data and the Charge 1 data.

EXAMPLE 7

Hydrogen Storage, Phase 2

Figure 2:
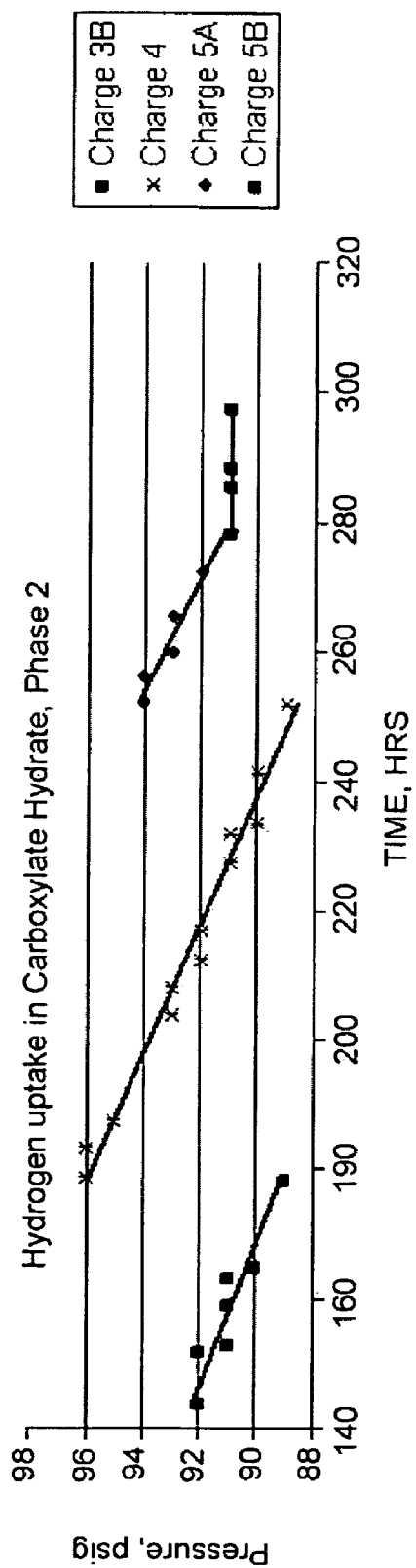
FIGS. 2, 3, 4 and 5 show hydrogen uptake in a lactate clathrate.

This section represents an extension of the testing reported above. FIG. 3 graphs the data for Phase 2 and is comparable to FIG. 2.

The least squares fit for this data is

For Charge 3B

Psig=105.14−0.0896(Time)

For Charge 4

Psig=113.53−0.0987(Time)

For Charge 5A

Psig=123.2−0.1151(Time)

Table 12 is the hydrogen uptake data for Phase 2 and is comparable to Table 10.

TABLE 12

| Time, hours | Pressure, psig |
|---|---|
| Charge 3B | |
| 143.9 | 92 |
| 152.2 | 92 |
| 153.1 | 91 |
| 159.4 | 91 |
| 163.5 | 91 |
| 165.1 | 90 |
| 178.4 | 89 |
| Charge 4 | |
| 178.7 | 96 |
| 183.4 | 96 |
| 187.8 | 95 |
| 203.8 | 93 |
| 208.1 | 93 |
| 212.4 | 92 |
| 217.1 | 92 |
| 227.4 | 91 |
| 232.0 | 91 |
| 233.4 | 90 |
| 241.3 | 90 |
| 251.9 | 89 |
| Charge 5A | |
| 252.2 | 94 |
| 256.2 | 94 |
| 259.6 | 93 |
| 265.4 | 93 |
| 272.1 | 92 |
| 278.2 | 91 |

EXAMPLE 8

Hydrogen Phase 3

This section represents an extension of the testing reported above. Table 13 lists the data for Phase 3 and is comparable to Table 10 and 12.

The least squares fit for this data is

For Charge 5B Psig=116.95−0.0896(Time)

For Charge 6 Psig=136.08−0.1292(Time)

TABLE 13

| Time, hours | Pressure, psig |
|---|---|
| Charge 5B | |
| 285.5 | 91 |
| 288.5 | 91 |
| 297.5 | 91 |
| 298.5 | 90 |
| 304.3 | 90 |
| 309.5 | 89 |
| 315.5 | 89 |
| 316.6 | 88 |
| Charge 6A | |
| 316.8 | 95 |
| 323.1 | 95 |
| 323.5 | 94 |
| 328.0 | 94 |
| 328.6 | 93 |
| 333.2 | 93 |
| 337.0 | 93 |
| Charge 6B | |
| 338.8 | 92 |
| 345.9 | 92 |
| 350.0 | 92 |
| 354.0 | 91 |

TABLE 14

| Charge 5B | | |
|---|---|---|
| Initial | 92.2 | 5.683 |
| Final | 88.6 | 5.493 |
| Change | | 0.190 |
| Charge 6A | | |
| Initial | 95.1 | 5.837 |
| Final | 92.3 | 5.688 |
| Change | | 0.149 |
| Total Change, Phase 3 | | 0.339 |
| Total Change, Phase 2 | | 0.699 |
| Total Change, Phase 1 | | 0.736 |
| Grand Total | | 1.774 |
| Moles H2/Mole La | | 12.2 |

The last entry in Table 14 indicates that nearly twelve moles of hydrogen were stored for each mole of lactate. This is consistent with two moles of hydrogen being stored in each of five large cells and one mole of hydrogen stored in each small cell in an sI clathrate structure.

Storing 12 moles of hydrogen for one mole of carboxylate gives 12 moles of hydrogen to a formula weight of 391. This is 5.78% by weight=(24/(391+24)*100%.

Figure 4:
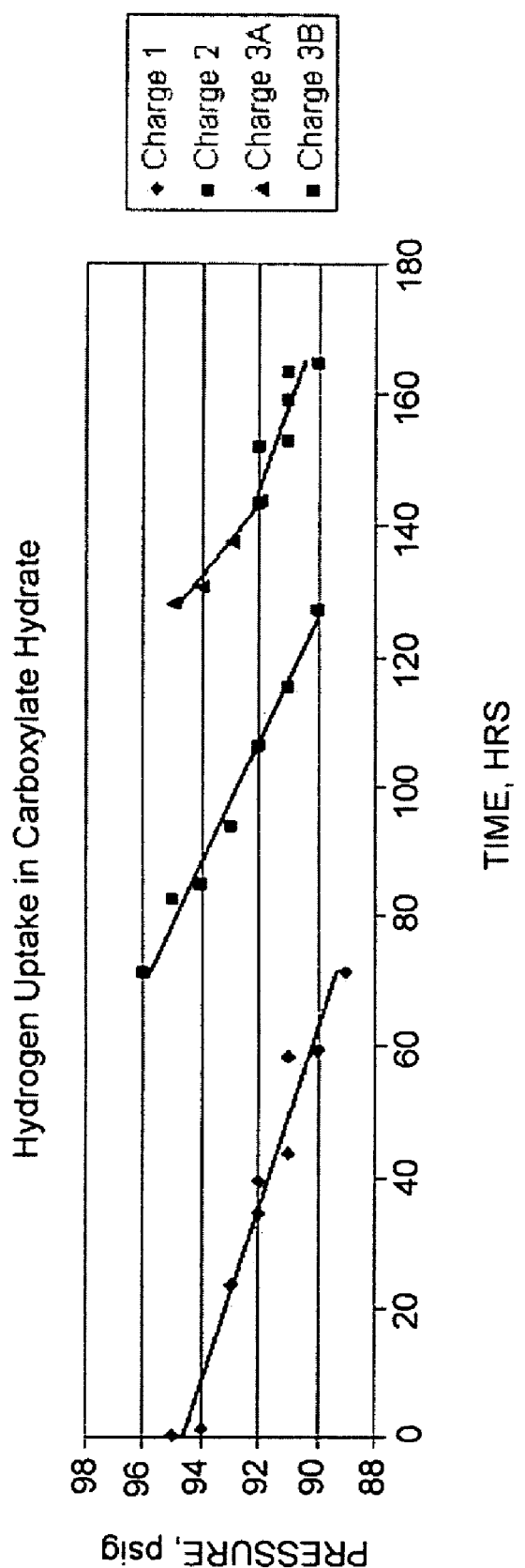

FIG. 4 is a plot of the data from Table 14.

EXAMPLE 9

Hydrogen Storage, Phase 4

This section represents an extension of the testing reported above. Table 15 lists the data for Phase 4 and is comparable to Tables 11 and 14.

The least squares fit for this data is
For Charge 6B Psig=108.87−0.0495(Time)
For Charge 7 Psig=135.9−0.1009(Time)
For Charge 8A Psig=143.41−0.1017(Time)

TABLE 15

| Time, hours | Pressure, psig |
|---|---|
| Charge 6B | |
| 338.8 | 92 |
| 345.9 | 92 |
| 350.0 | 92 |
| 354.0 | 91 |
| 359.2 | 91 |
| 369.2 | 91 |
| 370.4 | 90 |
| 374.0 | 90 |
| 406.0 | 89 |
| Charge 7 | |
| 407.0 | 95 |
| 418.0 | 94 |
| 422.1 | 93 |
| 425.6 | 93 |
| 428.2 | 93 |
| 430.2 | 92 |
| 440.9 | 91 |
| 445.5 | 91 |
| 452.5 | 91 |
| 453.6 | 90 |
| 463.8 | 89 |
| Charge 8A | |
| 464.5 | 96 |
| 468.6 | 96 |
| 473.1 | 95 |
| 477.6 | 95 |
| 484.4 | 94 |
| 490.8 | 94 |
| 494.5 | 93 |
| 503.5 | 92 |
| Charge 8B | |
| 507.5 | 92 |
| 512.8 | 92 |
| 518.8 | 91 |
| 525.8 | 91 |
| 529.3 | 91 |
| 531.7 | 90 |

TABLE 16

| Charge 6B | | |
|---|---|---|
| Initial | 92.1 | 5.678 |
| Final | 88.8 | 5.503 |
| Change | | 0.175 |
| Charge 7 | | |
| Initial | 94.8 | 5.821 |
| Final | 89.1 | 5.519 |

TABLE 16-continued

| | | |
|---|---|---|
| Change | | 0.302 |
| Charge 8A | | |
| Initial | 96.2 | 5.895 |
| Final | 92.2 | 5.683 |
| Change | | 0.212 |
| Total Change, Phase 4 | | 0.689 |
| Total Change, Phase 3 | | 0.339 |
| Total Change, Phase 2 | | 0.699 |
| Total Change, Phase 1 | | 0.76 |
| Grand Total | | 2.463 |
| Moles $H_2$/Mole La | | 16.9 |

The last entry in Table 16 indicates that nearly seventeen moles of hydrogen were stored in each mole of lactate. This is consistent with three moles of hydrogen being stored in each of five large cells and one mole of hydrogen stored in each small cell in an sI clathrate structure.

Storing 17 moles of hydrogen for one mole of carboxylate gives 17 moles of hydrogen to a formula weight of 391. This is 8.00% by weight (34/(391+34)*100%.

Figure 5:
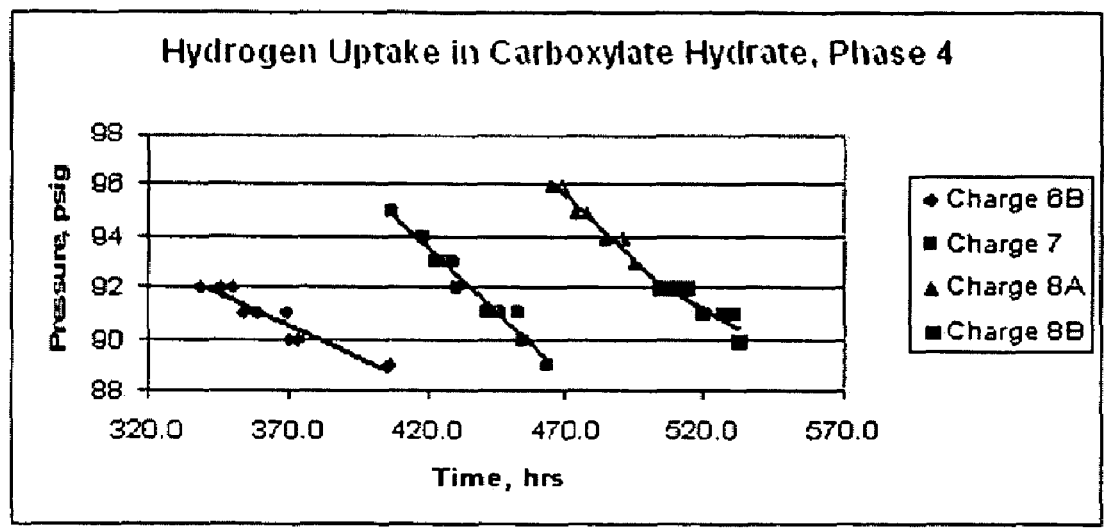

FIG. 5 is a plot of the data from Table 16.

CONCLUSION

Testing has shown the ability of a carboxylic hydrate to absorb seventeen molecules of hydrogen for each molecule of carboxylate present. This is consistent with each carboxylate molecule occupying one of six large cages in the sI clathrate structure and three molecules of hydrogen occupying each of the other five large cages and one molecule of hydrogen in each of two small cages of the sI clathrate.

A number of embodiments of the invention have been described. Nevertheless, it will be understood that various modifications may be made without departing from the spirit and scope of the invention.

What is claimed is:

1. A solid clathrate hydrate comprising lactate anion and calcium cation.

2. The solid clathrate hydrate of claim 1 further comprising a gas stored in said clathrate hydrate.

3. The solid clathrate of claim 1 or claim 2 in which said clathrate is solid and stable at a temperature of 10° C. and a pressure of 14.7 psi.

4. The solid clathrate of claim 2 in which the gas is characterized by a molecular diameter of 6 Å or less.

5. The solid clathrate of claim 2 in which the gas is selected from methane, hydrogen, oxygen, and carbon dioxide.

6. The solid clathrate of claim 2 in which said gas comprises at least 5% of the clathrate by weight (gravimetric).

7. The solid clathrate of claim 1 or claim 2 further comprising a cation selected from the group consisting of sodium, potassium and magnesium.

8. The solid clathrate of claim 2 in which said gas is present at a density of at least 3 g/l in said clathrate.

9. The solid clathrate of claim 2 in which said gas is hydrogen.

10. The solid clathrate of claim 2 in which said gas is oxygen.

11. The solid clathrate of claim 2 in which said gas is methane.

12. The solid clathrate of claim 1 further comprising acetate.

13. The solid clathrate of claim 1 in which said clathrate exhibits a long broad peak above 3000 $cm^{-1}$ in Raman spectrometry for the O—H stretching mode.

14. The solid clathrate of claim 1 further characterized in that said clathrate is an sI clathrate structure.

15. The solid clathrate of any of claims 1, 2 or 4 wherein the unit cell volume is between 300 and 500 Å$^3$.

16. The solid clathrate of claim 2 in which the gas is carbon dioxide.

17. The solid clathrate of claim 16 in which the clathrate further comprises sodium cation.

18. A solid sI clathrate hydrate comprising
a carboxylate anion;
a cation; and
a gas having a molecular diameter of 6 Å or less,
said clathrate hydrate being characterized in that said gas comprises at least 5% by weight of the clathrate hydrate;
and said clathrate is solid and stable at a temperature of 10° C. and a pressure of 165 psi.

* * * * *